US009156474B2

United States Patent
Holub et al.

(10) Patent No.: US 9,156,474 B2
(45) Date of Patent: Oct. 13, 2015

(54) JURISDICTION-AWARE FUNCTION CONTROL AND CONFIGURATION FOR MOTOR VEHICLES

(75) Inventors: Patrick Kevin Holub, Novi, MI (US); Mark Scalf, Warren, MI (US); John Robert Van Wiemeersch, Novi, MI (US); Lisa Therese Boran, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1507 days.

(21) Appl. No.: 12/564,957

(22) Filed: Sep. 23, 2009

(65) Prior Publication Data

US 2011/0071701 A1    Mar. 24, 2011

(51) Int. Cl.
*G08G 1/123*    (2006.01)
*B60W 50/00*    (2006.01)

(52) U.S. Cl.
CPC ... *B60W 50/0098* (2013.01); *B60W 2050/0078* (2013.01); *B60W 2550/16* (2013.01)

(58) Field of Classification Search
USPC ............ 340/539.13, 539.26, 573.4, 572.4; 701/200, 206, 208, 2, 400, 408, 409, 701/450, 451, 454, 461, 462, 516, 517, 523, 701/532; 345/156
See application file for complete search history.

(56) References Cited

U.S. PATENT DOCUMENTS

| 5,247,440 | A | 9/1993 | Capurka et al. |
| 6,040,766 | A | 3/2000 | Lübke et al. |
| 7,363,357 | B2 | 4/2008 | Parupudi et al. |
| 8,009,037 | B2 * | 8/2011 | Staton et al. ............. 340/539.13 |
| 2006/0100777 | A1 * | 5/2006 | Staton et al. .................. 701/200 |
| 2008/0021637 | A1 * | 1/2008 | Staton et al. .................. 701/207 |
| 2008/0176539 | A1 * | 7/2008 | Staton et al. ............... 455/414.1 |

FOREIGN PATENT DOCUMENTS

EP    1302746 A1    4/2003

* cited by examiner

*Primary Examiner* — Ronnie Mancho
(74) *Attorney, Agent, or Firm* — Frank MacKenzie; MacMillan, Sobanski & Todd, LLC

(57) ABSTRACT

Apparatus for a motor vehicle comprises a location monitor for determining vehicle coordinates for an instantaneous vehicle position within a predetermined reference system. A jurisdictional map database is provided for relating a plurality of jurisdictions to corresponding ranges of coordinates in the predetermined reference system. A regulation database is provided for relating a plurality of vehicle functions to corresponding parametric limitations for respective jurisdictions. A user interface is coupled to the regulation database for configuring at least one of the parametric limitations. A controller is coupled to the location monitor, the jurisdictional map database, and the regulation database for identifying a current jurisdiction in response to the vehicle coordinates, identifying at least one vehicle function having a parametric limitation for the current jurisdiction, and modifying the action of the identified vehicle function to comply with the respective parametric limitation.

19 Claims, 2 Drawing Sheets

JURISDICTION-AWARE FUNCTION CONTROL AND CONFIGURATION FOR MOTOR VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automatic control systems for regulated functions of motor vehicles, and, more specifically, to a location-based control system that may be configured to prevent certain functions of a motor vehicle from operating in a manner inconsistent with governmental regulations or user-imposed rules.

The operation of certain functions and features of motor vehicles are regulated by various governmental authorities for various jurisdictions. The regulations are frequently inconsistent so that use of a particular function or parameters applied to the function that are acceptable in one jurisdiction may be impermissible in another. Consequently, vehicle functions are often designed according to parameters that comply with the most restrictive regulations at all times even though the vehicle user may desire a different level of performance in a less restrictive jurisdiction. For example, one jurisdiction may place restrictions on the use, audio volume, time-of-day of operation, and duration of an audible alarm for vehicle security alarms. Other jurisdictions may have similar but different requirements, some of which are more restrictive and some less restrictive. In order to meet these jurisdictional regulation conflicts, vehicle manufacturers must choose between a single design delivering the "lowest common denominator" of performance to meet everyone's regulations or accept the cost and complexity associated with maintaining different designs for different jurisdictions and managing the extra inventory logistics.

By way of another example, remote engine starting is becoming a popular option because it can precondition the temperature of the vehicle cabin, seating and steering wheel surfaces in both hot and cold climates and can defog/deice windows in cold climates. However, the use of remote starting has been prohibited by some local, state, and national governments.

There is currently no way for vehicle owners to easily keep track of and know the details of the regulations that they may be subject to when using a remote vehicle engine starter in their many travel destinations. There is also currently no easy and effective way for vehicle manufacturers to address this problem through known means due to the disparity between jurisdictions and the often small size of the municipalities that have such regulations. Enabling or disabling the remote start function at a selling or servicing dealership is impractical because the vehicle cannot be expected to remain in the same jurisdiction during its useful lifetime and such boundaries may even be crossed on a daily basis.

Some prior art vehicle systems have used a locating system such as the Global Positioning System (GPS) to monitor the vehicle location and compare it to known jurisdictions to enable or defeat certain functions. For example, U.S. Pat. No. 5,724,440 discloses the use of a navigation system to determine vehicle driving location so that a function such as daytime headlamp illumination can be operated in accordance with local regulations. Similarly, U.S. Pat. No. 6,040,766 uses a GPS receiver to determine the country in which the vehicle is located in order to adopt corresponding vehicle features, such as units of measure for speed and fuel gauges and a switch condition for lighting systems. However, the known systems rely exclusively on a predetermined, fixed relationship between location and the corresponding regulations. The manufacturer or some other third party must first define the performance limits, and thus undertakes responsibility for the accuracy of the knowledge of all the potential jurisdictions involved even though the regulations may change over time. Furthermore, the prior systems have not taken into account the possible desire for the vehicle user to provide quasi-jurisdictional limitations for their vehicle features (such as allowing normal vehicle alarm performance when away from home, but preventing operation during certain hours when the vehicle is at home).

A further limitation of the prior art is that functions affected according to the vehicle position for purposes of regulatory compliance have primarily related to driving operations (e.g., with the vehicle moving so that the position/jurisdiction is changing). However, many regulated aspects of vehicle functions involve a parked vehicle such as the regulation of audible security alarms mentioned above. Other examples include diesel engine idle shutdown (in which a parked vehicle must be shut off after a prescribed engine idling time) and brake transmission shift interlock (BTSI) manual override (which is not allowed in some jurisdictions).

These are some of the disadvantages of the prior art overcome by the present invention.

SUMMARY OF THE INVENTION

In one aspect of the invention, apparatus for a motor vehicle comprises a location monitor for determining vehicle coordinates for an instantaneous vehicle position within a predetermined reference system. A jurisdictional map database is provided for relating a plurality of jurisdictions to corresponding ranges of coordinates in the predetermined reference system. A regulation database is provided for relating a plurality of vehicle functions to corresponding parametric limitations for respective jurisdictions. A user interface is coupled to the regulation database for configuring at least one of the parametric limitations. A controller is coupled to the location monitor, the jurisdictional map database, and the regulation database for identifying a current jurisdiction in response to the vehicle coordinates, identifying at least one vehicle function having a parametric limitation for the current jurisdiction, and modifying the action of the identified vehicle function to comply with the respective parametric limitation.

DETAILED DESCRIPTION OF PREFERRED EMBODIMENTS

Figure 1:
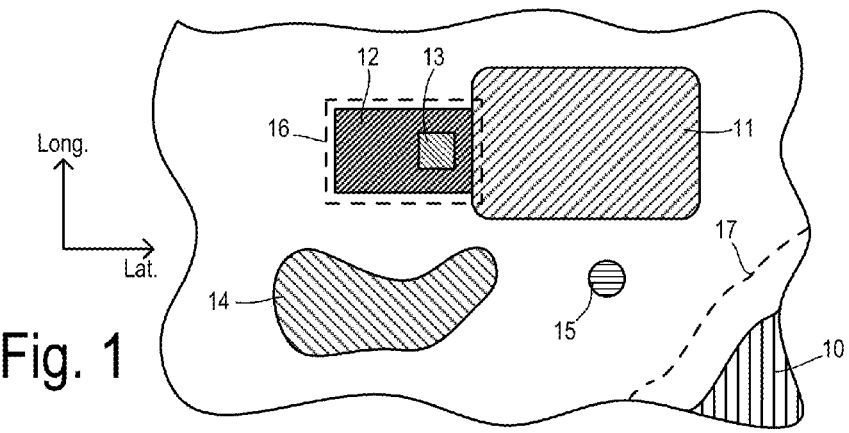
FIG. 1 is an example of jurisdictions and their boundaries within a geographic space.

Referring to FIG. 1, a graphic depiction is given of various jurisdictions defined in a master map database which uses a geographic reference system (e.g., latitude-longitude). Individual jurisdictions are defined according to their boundaries (e.g., as a function of a range of coordinate values in the reference system or by otherwise specifying two-dimensional closed curves). FIG. 1 shows jurisdictions 10-15 that may be governmental territories imposing respective regulatory requirements or may be other user-customized regions defined by a particular user for a particular customized purpose. Jurisdictions 11 and 12 are adjoining so that they share a partial border in common. Jurisdiction 13 is wholly contained within jurisdiction 12. There may be an exclusive relationship between jurisdictions 12 and 13 such that a location within jurisdiction 13 does not come within jurisdiction 12 (as with a city within another city) or there may be an inclusive relationship wherein a location within jurisdiction 13 is also governed by jurisdiction 12 (as with a city within a State or a county).

The master map database preferably defines one or more buffer zones for respective jurisdictions in order to account for any inaccuracies in determining the location coordinates of a vehicle. When a location monitoring system places the vehicle in a buffer zone and the buffer zone has a more restrictive regulation than outside the corresponding jurisdiction, then the more restrictive regulation is adopted by the vehicle to ensure compliance to the more restrictive jurisdiction. A buffer zone around jurisdiction 12 is defined according to an outer periphery 16. Depending upon ii) the type of jurisdiction (e.g., a State or a country), the significance of a particular jurisdiction, or the particular functions being regulated by a jurisdiction, the size of the buffer zone may be greater or smaller in order to best mitigate the risk of noncompliance. Thus, a buffer zone around jurisdiction 10 has a larger size, as defined by a periphery line 17 being at a greater distance from jurisdiction 10.

The data representations for respective jurisdictions in the map database may include predetermined data structures to represent major entities, such as are provided in a conventional navigation database. The map database may also include user-defined jurisdictions that may correspond to a governmental entity or to a personally defined region of interest for a particular user. For example, region 15 may be a customized jurisdiction representing a small area around a user's home or any other area where the user wants to obtain specialized performance for a vehicle function to be controlled according to the present invention.

Figure 2:
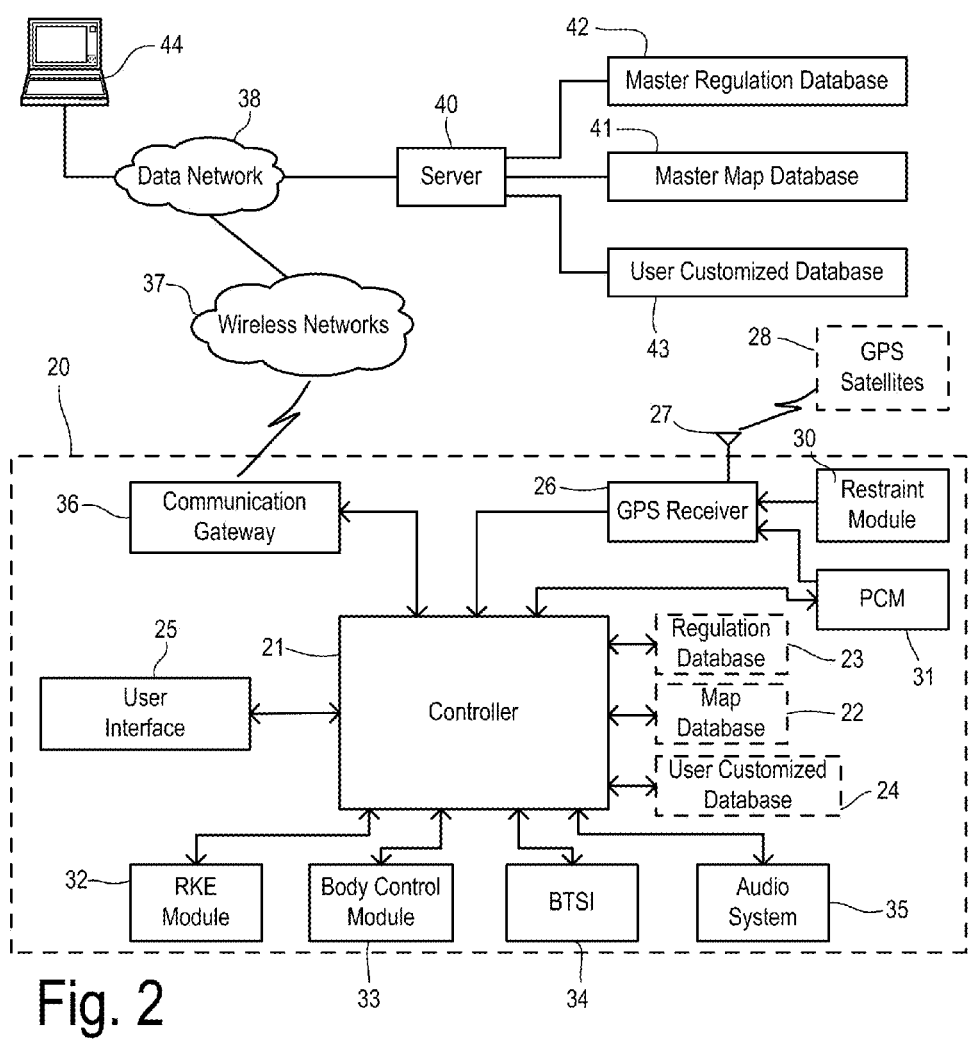
FIG. 2 is a block diagram showing hardware and system elements for one preferred embodiment of the invention.

A preferred embodiment of the present invention is shown in greater detail in FIG. 2. A motor vehicle system 20 includes a controller 21 for implementing the jurisdiction-aware function control and configuration of the present invention. Although controller 21 is shown generically as a separate unit, the corresponding control functions can be incorporated into one or more electronic modules in a vehicle (some of which may be associated with other systems or locations in the vehicle). Controller 21 incorporates or is coupled to a map database 22, a regulation database 23, and a user customized database 24. Map database 22 relates a plurality of jurisdictions to corresponding coordinates (or ranges of coordinates) in the predetermined reference system. Regulation database 23 relates a plurality of vehicle functions to corresponding parametric limitations for respective jurisdictions, wherein a parametric limitation defines a performance level (e.g., on, off, or some regulated limit that applies to a particular vehicle function, such as maximum idle time). User customized database 24 may include both user-defined jurisdiction definitions and user-defined parametric limitations. A user interface 25 is provided in order to allow the user to input data to controller 21 that defines the jurisdictions or areas and the limitations (which may be applied to either a user-defined jurisdiction or to a preconfigured jurisdiction). User interface 25 may include a touch screen, keypad, keyboard, text display, voice recognition unit, voice synthesis unit, or other known user interface devices.

A location monitor is comprised of a GPS receiver 26 and GPS antenna 27. In response to signals received from GPS satellites 28, GPS receiver 26 calculates vehicle coordinates for an instantaneous vehicle position within the predetermined reference system (e.g., latitude/longitude). In order to enhance the GPS-derived position, it is preferable to use an inertial-measurement-unit-enabled dead-reckoning function or other supplemental means to improve the accuracy and coverage of location monitoring (such as when the GPS satellites are unreceivable due to obstructions). Thus, an acceleration signal for monitoring direction changes is obtained from an accelerometer contained in a restraint control module 30, and a speed signal is obtained from a powertrain control module (PCM) 31. The signals are coupled to GPS receiver 26 so that the instantaneous vehicle coordinates can continue to be updated even without GPS signals.

The controlled functions to be influenced by the present invention may be implemented within controller 21 or may be located in a different module within the vehicle. For example, a remote start function or a diesel idle shutdown function may be performed (at least in part) by PCM 31. An audible security alarm function or a remote start function may be controlled using a remote keyless entry (RKE) module 32. The jurisdiction-aware controller 21 may be co-located in PCM 31, an RF receiving module (such as RKE module 32), or a body control module (BCM) 33, for example. Additional systems that can be controlled include a brake transmission shift interlock (BTSI) 34 and an audio system 35. BTSI 34 may include a manual override function which is allowed by some jurisdictions and not by others. Audio system 35 generates an audio volume that may be subject to certain limitations of sound pressure level (SPL) in some jurisdictions.

Map database 22, regulation database 23, and user-customized database 24 are shown with dashed lines to indicate that they may be optionally located onboard within vehicle system 20. Alternatively, they can be located offboard where they can be maintained and updated by a third party. In another alternative, both onboard and offboard databases can be used. Preferably, the on-board database is only a locally relevant subset of the unabridged off-board database to minimize on-board computer memory requirements.

Vehicle system 20 includes a communication gateway 36 for connecting with a wireless network 37 (e.g., a Wi-Fi, GSM, CDMA2000, EV-DO, or WiMAX network) to facilitate data communication between vehicle system 20 with a remote infrastructure that may include a data network 38 (such as the Internet) coupled to an offboard server 40. Consequently, a portion of the controller for the present invention is located offboard. The offboard portion may include a master map database 41, a master regulation database 42, and a user customized database 43, which are all similar to the previously described onboard databases. A workstation 44 is connected with data network 38 and may provide a channel for either the user to configure user customized database 43 or a third party manufacturer or service provider to configure master map database 41 and master regulation database 42. In one embodiment, vehicle communication gateway 36 may send the vehicle coordinates to server 40 so that the jurisdiction is determined offboard, any relevant parametric limitations associated with that jurisdiction are identified offboard and sent back to vehicle communications gateway 36, and stored by controller 21 or the affected system for implementation. In an alternative embodiment, the contents of the offboard databases may be transferred through communication gateway 36 to the corresponding onboard databases so that the identification of the jurisdiction and the parametric limitations are performed on the vehicle. Parametric limitations configured through user interface 25 may also be sent via communication gateway 36 to offboard database 43 for storage on server 40 and alternative access via workstation 44.

In addition to wireless communication, gateway 36 may alternatively provide a wired interface such as a USB connection. The offboard databases or server can accordingly be comprised of a USB connected device such as a flash drive or a portable navigation unit.

Operation of one preferred embodiment will be described in connection with the flowchart of FIG. 3. The system initializes with the key off in step 50. A check is performed in step 51 to determine whether the ignition key has been turned to is the on position. If it has, then the location monitor (i.e., enhanced GPS) determines the instantaneous vehicle coordinates in step 52. In step 53, all the current jurisdictions and buffer zones are detected in response to the vehicle coordinates. Parametric limitations based on regulations relevant to the identified jurisdiction are retrieved and then stored in step 54 as active items in the event that a corresponding function is accessed while in the current jurisdiction. When a buffer zone is detected, the parametric limitations are only stored if there are not more restrictive limitations already stored for another jurisdiction.

In step 55, the distances to the nearest exit point(s) from the current jurisdiction(s) and entry point(s) to surrounding jurisdictions are determined using the map database. The minima of these distances is identified and then used in step 56 for checking whether the distance traveled by the vehicle becomes greater than the shortest exit or entry distance. When such a distance has been traveled, then a return is made to step 52 in order to update the current jurisdiction(s) and any corresponding parametric limitations. In step 57 a check is made to determine whether the vehicle has been parked and the key turned off. If not, then a return is made to step 56 in order to continue monitoring the current jurisdiction(s). If the key is turned off, then the method proceeds to step 58.

Figure 3:
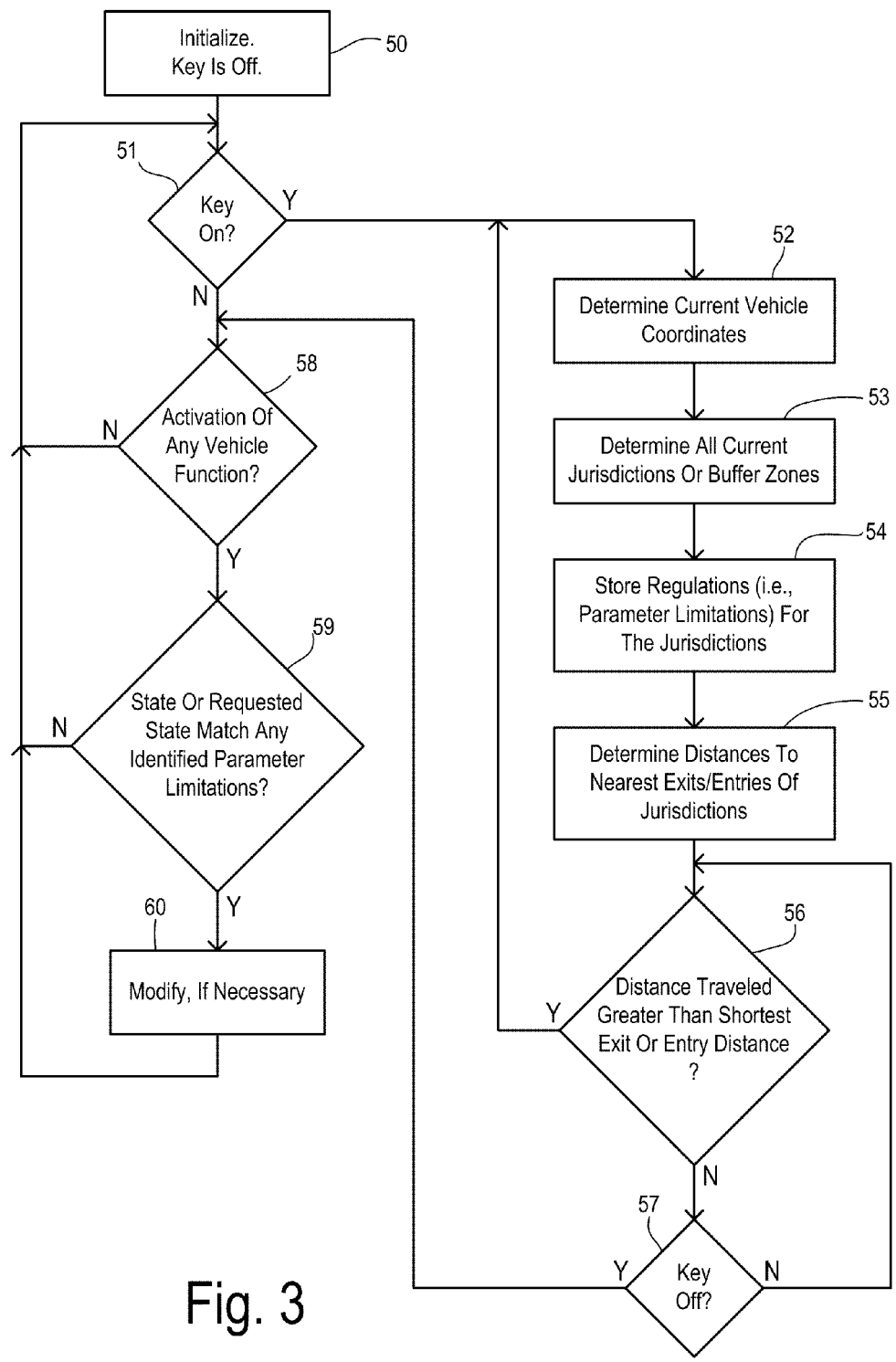
FIG. 3 is a flowchart showing one example method of the present invention.

When the key is detected as being off in steps 51 or 57, the method of FIG. 3 monitors for any access to vehicle functions that are affected by stored parameter limitations. Thus, in step 58, a check is made to determine whether there is an attempted activation of any vehicle function while being parked. If not, then the key position continues to be monitored in step 51. Otherwise, a check is made in step 59 to determine whether the active state or the requested state of the vehicle function ii) has any parametric limitations that were stored in step 54. If not, then the key position continues to be monitored in step 51. Otherwise, the vehicle function is modified as necessary in step 60 to keep operation of the vehicle function within the stored parametric limitations.

As applied to remote vehicle starting, the present invention performs the is steps of determining the parked vehicle's GPS location, comparing that GPS location to a remote start regulatory database, and either inhibiting or enabling the remote start function based on the outcome of the comparison. Control of the function can be through the physical interruption of the remote start circuit (e.g., using a relay) or, more preferably, using a software-controlled logic state in an electronic control module. The GPS location can be the last one detected during the vehicle key-off event (to prevent remote start key-on arbitration delay) or can alternatively use a GPS location sensed following detection of a remote start key-on signal. The remote start regulatory database can be onboard or offboard the vehicle (via vehicle wireless connectivity). Onboard database implementations can also use wireless connectivity for periodic updates of the regulatory database. The comparison algorithm can be executed onboard or offboard the vehicle (again via vehicle wireless connectivity). The inhibit or enable status can be set during/immediately following the key-off event (to prevent remote start key-on arbitration delay) or following detection of a remote start key-on signal.

The invention as applied to the remote start function provides significant advantages. Manufacturing costs are minimized since the invention uses equipment already available on most remote start equipped vehicles. Improved functionality is obtained for both the manufacturer and the consumer, namely protection against regulatory infractions and their consequences. The invention provides the manufacturer with the freedom to bundle remote starters in option packages in ways that minimize build complexity and inventory holding costs.

The same control methodology can be used to comply with the California Air Resources Board (CARB) Diesel Engine Idle Shutdown regulation. Currently, any diesel vehicle over 14,000 lb GVW operating in California must have engine shutdown algorithms to prevent excess idling and air pollution. Manufacturers have traditionally produced separate California and non-California versions of their vehicles, thereby adding to build complexity and inventory costs. With GPS-based initiation of the engine idle shutdown algorithm, the complexity and extra inventory is are eliminated. The parametric limitation for the idle shutdown function may be either an on/off parameter (i.e., whether there is any limitation at all) or a maximum permitted idle time (in the event that different jurisdictions mandate different times).

As applied to the electronic brake transmission shift interlock (BTSI) manual override function, the corresponding parametric limitation involves whether a manual override is permitted.

As previously mentioned, when using a service provider or vehicle manufacturer to provide and communicate the map and regulatory databases, they assume responsibility for the accuracy of the databases. They must continuously monitor local laws and ordinances to ensure that the information is correct. As an alternative or supplement, an HMI GUI can be provided in the vehicle that allows consumers to program the disabling of features by selecting an address, city, state/province, county, zip code, or country and specifying the corresponding limitations. While allowing the consumer to assume compliance responsibility, it further offers them the convenience of being able to program features in a manner beyond any actual governmental regulations. For example, the user may not want the vehicle alarm to ever go off when the car is in their garage. Another use would be a trucking company that decides to implement an idle shutdown function in places where there are no regulations or to reduce the maximum idle time to less than what the regulations require. The invention allows them all to enter a rule to prevent it. The GUI may also offer tips to the user as to where to look on the web for ordinances/laws.

What is claimed is:

1. Apparatus for a motor vehicle comprising:
   a location monitor for determining vehicle coordinates for an instantaneous vehicle position within a predetermined reference system;
   a jurisdictional map database relating a plurality of jurisdictions to corresponding ranges of coordinates in the predetermined reference system;

a regulation database relating a plurality of vehicle functions to corresponding parametric limitations imposed by governmental authorities for respective jurisdictions;
a user interface within the motor vehicle coupled to the regulation database for configuring at least one of the parametric limitations by a user of the motor vehicle; and
a controller residing at least partially in the motor vehicle and coupled to the location monitor, the jurisdictional map database, and the regulation database for identifying a current jurisdiction in response to the vehicle coordinates, identifying at least one vehicle function having a parametric limitation for the current jurisdiction, and modifying the action of the identified vehicle function to comply with the respective parametric limitation.

2. The apparatus of claim 1 wherein the user interface is coupled to the jurisdictional map database for configuring at least one customized jurisdiction.

3. The apparatus of claim 1 further comprising:
a communication gateway for providing data communication between the vehicle and an offboard server, wherein at least a portion of the controller resides in the offboard server;
wherein the jurisdictional map database is offboard and is coupled to the offboard server, and wherein the vehicle coordinates are sent via the communication gateway to the offboard server for identifying the one or more currently identified jurisdictions.

4. The apparatus of claim 1 further comprising:
a communication gateway for providing data communication between the vehicle and an offboard server, wherein at least a portion of the controller resides in the offboard server;
wherein the regulation database is offboard and is coupled to the offboard server, and wherein the parametric limitations are identified by the portion of the controller in the offboard server and then sent via the communication gateway to a portion of the controller residing in the vehicle.

5. The apparatus of claim 4 wherein parametric limitations configured using the user interface are sent via the communication gateway to the offboard regulation database.

6. The apparatus of claim 1 wherein the controller detects buffer zones corresponding to boundaries of the jurisdictions in the jurisdictional map database, and wherein the controller modifies an action of a vehicle function to comply with a respective parametric limitation when the vehicle coordinates correspond to a buffer zone unless a respective parametric limitation is more restrictive in a current jurisdiction actually indicated by the vehicle coordinates.

7. The apparatus of claim 6 wherein the buffer zones have a plurality of respective sizes according to an identity of a respective jurisdiction or a respective type of jurisdiction.

8. The apparatus of claim 1 wherein at least a portion of the controller resides onboard the vehicle in a module selected from the group comprising an RF receiving module, a body control module, a GPS receiver module, and a communications gateway module.

9. The apparatus of claim 1 wherein the location monitor is comprised of a GPS receiver enhanced with an inertial-measurement-unit-enabled dead-reckoning function.

10. The apparatus of claim 1 wherein the controller detects use of the identified vehicle function and then initiates modification of the action of the identified vehicle function to comply with the respective parametric limitation.

11. Apparatus for a motor vehicle comprising:
a location monitor for determining vehicle coordinates for a parked vehicle position within a predetermined reference system;
a jurisdictional map database relating a plurality of jurisdictions to corresponding ranges of coordinates in the predetermined reference system;
a regulation database relating at least one vehicle function to corresponding parametric limitations imposed by governmental authorities for respective jurisdictions; and
a controller residing at least partially in the motor vehicle and coupled to the location monitor, the jurisdictional map database, and the regulation database for identifying a current jurisdiction in response to the vehicle coordinates, identifying the at least one vehicle function having a parametric limitation for the current jurisdiction, and modifying the action of the vehicle function to comply with the respective parametric limitation;
wherein the vehicle function is selected from the group comprising a remote start function, an audible alarm function, an idle shutdown function, and a brake transmission shift interlock override function, and wherein the parametric limitation is respectively selected from the group comprising operability of remote start, volume of an audible alarm, maximum permitted idle time, and operability of manual override, respectively.

12. The apparatus of claim 11 further comprising:
a communication gateway for providing data communication between the vehicle and an offboard server, wherein at least a portion of the controller resides in the offboard server;
wherein the jurisdictional map database is offboard and is coupled to the offboard server, and wherein the vehicle coordinates are sent via the communication gateway to the offboard server for identifying the one or more currently identified jurisdictions.

13. The apparatus of claim 11 further comprising:
a communication gateway for providing data communication between the vehicle and an offboard server, wherein at least a portion of the controller resides in the offboard server;
wherein the regulation database is offboard and is coupled to the offboard server, and wherein the parametric limitations are identified by the portion of the controller in the offboard server and then sent via the communication gateway to a portion of the controller residing in the vehicle for modifying the action of the vehicle function to comply with the respective parametric limitation.

14. The apparatus of claim 11 wherein the controller detects buffer zones corresponding to boundaries of the jurisdictions in the jurisdictional map database, and wherein the controller modifies an action of a vehicle function to comply with a respective parametric limitation when the vehicle coordinates correspond to a buffer zone unless a respective parametric limitation is more restrictive in a current jurisdiction actually indicated by the vehicle coordinates.

15. The apparatus of claim 14 wherein the buffer zones have a plurality of respective sizes according to an identity of a respective jurisdiction or a respective type of jurisdiction.

16. The apparatus of claim 11 wherein at least a portion of the controller resides onboard the vehicle in a module selected from the group comprising an RF receiving module, a body control module, a GPS receiver module, and a communications gateway module.

17. The apparatus of claim 11 wherein the location monitor is comprised of a GPS receiver enhanced with an inertial-measurement-unit-enabled dead-reckoning function.

18. The apparatus of claim 11 wherein the controller detects the intended use of the identified vehicle function and then initiates modification of the action of the identified vehicle function to comply with the respective parametric limitation.

19. The apparatus of claim 11 further comprising a user interface coupled to the regulation database for configuring at least one of the parametric limitations and at least one of the jurisdictions.

* * * * *